United States Patent
Liu et al.

(10) Patent No.: US 8,874,981 B2
(45) Date of Patent: Oct. 28, 2014

(54) METHOD OF CREATING TARGET STORAGE LAYOUT TABLE REFERENCED FOR PARTITIONING STORAGE SPACE OF STORAGE DEVICE AND RELATED ELECTRONIC DEVICE AND MACHINE-READABLE MEDIUM

(75) Inventors: Meng-Chang Liu, Taipei Hsien (TW); Chen-Tsung Hsieh, Tainan (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 165 days.

(21) Appl. No.: 12/912,751

(22) Filed: Oct. 27, 2010

(65) Prior Publication Data

US 2011/0283137 A1 Nov. 17, 2011

Related U.S. Application Data

(60) Provisional application No. 61/333,785, filed on May 12, 2010.

(51) Int. Cl.
*G06F 11/00* (2006.01)
*G06F 3/06* (2006.01)

(52) U.S. Cl.
CPC ............ *G06F 3/0644* (2013.01); *G06F 3/0616* (2013.01); *G06F 3/0679* (2013.01)
USPC .......................... 714/723; 714/6.13; 711/173

(58) Field of Classification Search
USPC .................................. 714/723, 6.13; 711/173
See application file for complete search history.

(56) References Cited

U.S. PATENT DOCUMENTS

| | | | | |
|---|---|---|---|---|
| 5,111,444 | A * | 5/1992 | Fukushima et al. | 369/53.17 |
| 5,740,349 | A * | 4/1998 | Hasbun et al. | 714/6.13 |
| 7,013,376 | B2 * | 3/2006 | Hooper, III | 711/202 |
| 7,295,479 | B2 * | 11/2007 | Yoon et al. | 365/200 |
| 2003/0225960 | A1* | 12/2003 | Guu et al. | 711/103 |
| 2008/0082736 | A1* | 4/2008 | Chow et al. | 711/103 |
| 2009/0240873 | A1* | 9/2009 | Yu et al. | 711/103 |
| 2010/0251044 | A1* | 9/2010 | Khatri et al. | 714/723 |
| 2012/0084611 | A1* | 4/2012 | Flynn et al. | 714/723 |

* cited by examiner

*Primary Examiner* — Yolanda L Wilson
(74) *Attorney, Agent, or Firm* — Winston Hsu; Scott Margo

(57) ABSTRACT

An exemplary method of creating a target storage layout table referenced for partitioning a storage space of a storage device includes following steps: identifying defective storage areas in the storage space of the storage device, and accordingly generating an identification result; and creating the target storage layout table according to the identification result.

15 Claims, 7 Drawing Sheets

METHOD OF CREATING TARGET STORAGE LAYOUT TABLE REFERENCED FOR PARTITIONING STORAGE SPACE OF STORAGE DEVICE AND RELATED ELECTRONIC DEVICE AND MACHINE-READABLE MEDIUM

CROSS REFERENCE TO RELATED APPLICATIONS

This application claims the benefit of U.S. Provisional Application No. 61/333,785, filed on May 12, 2010 and incorporated herein by reference.

BACKGROUND

The disclosed embodiments of the present invention relate to partitioning a storage space of a storage device, and more particularly, to a method of creating a target storage layout table referenced for partitioning a storage space of a storage device (e.g., a flash device) and related electronic device and machine-readable medium.

Recently, handheld devices become more and more popular. Most of them aim at low price, small size, high computing power, and powerful functionality. Therefore, there is a need for an embedded operating system. For example, the Linux-based embedded system has some advantages such as no proprietary problem, high portability, and comparatively easy to be implemented. The Linux-based embedded system is usually a diskless system. In order to keep permanent data in the Linux-based embedded system, using a flash device as its disk system is a widely adopted strategy.

In general, a storage device may be partitioned into a plurality of partitions to facilitate the use of the storage device. Taking a Linux-based embedded system for example, a memory technology device (MTD) subsystem provides an abstract layer for raw flash devices, which makes it possible to use the same application programming interface (API) when working with flash devices of different flash types and technologies. The Linux-based embedded system is internally assigned a flash layout table referenced for partitioning an employed flash device (e.g., a NAND flash) into a plurality of partitions for different MTDs.

However, the flash device may have bad blocks scattered around the flash device when manufactured in the factory. For example, 80 bad blocks may be located anywhere in the flash device. However, there is no information available in the flash device for indicating the exact locations of these bad blocks scattered in the flash device after the flash device is manufactured and then shipped to the market. The conventional partitioning strategy has to consider the worst case when defining each partition in the flash device. Please refer to FIG. 1, which is a diagram illustrating a conventional flash layout table 100. The desired partitions PA, PB, PC, and PD originally required by the system have the sizes Size_A, Size_B, Size_C, and Size_D, respectively. As mentioned above, there are bad blocks scattered around the flash device, and the exact locations of these bad blocks are unknown after the manufactured flash device is shipped to the market. The conventional partitioning strategy therefore makes each actually used partition larger by having a reserved area included therein. As shown in FIG. 1, each of the reserved areas RSV_A, RSV_B, RSV_C, and RSV_D has the same size Size_R corresponding to an estimated maximum number of bad blocks scattered around the flash device. For example, each of the reserved areas RSV_A, RSV_B, RSV_C, and RSV_D contains at least 80 blocks. As a result, the flash layout table 100 defines four partitions PA', PB', PC', and PD' having the actual sizes Size_A+Size_R, Size_B+Size_R, Size_C+Size_R, and Size_D+Size_R, respectively. After the additional reserved areas are assigned to the partitions PA'-PD', the remaining storage area with the size Size_R' may act as a spare reserved area RSV_R of the flash device that can be used for other purposes such as data buffering.

Actually, some of the actual storage areas corresponding to the partitions PA', PB', PC', and PD' may have many bad blocks, and the remaining may have no bad block. Regarding an actual storage area corresponding to one of the partitions PA', PB', PC', and PD' that does not have bad blocks at all, the blocks included in the reserved area are not used, resulting in a waste of the storage space of the flash device. Moreover, as the partitions PA'-PD' have reserved areas RSV_A-RSV_D included therein, the spare reserved area RSV_R which may be used for other purposes would be small due to limited storage capacity of the flash device. As a result, the flash device initialized using the conventional flash layout table 100 shown in FIG. 1 may lack flexibility in the use of the spare reserved area RSV_R. In a worst case, the flash device partitioned using the conventional partitioning strategy may have no remaining storage area available for acting as the aforementioned spare reserved area RSV_R. Regarding an application which is equipped with a storage device with small storage space, applying the conventional partitioning strategy to the storage device is impractical.

SUMMARY

In accordance with exemplary embodiments of the present invention, a method of creating a target storage layout table referenced for partitioning a storage space of a storage device (e.g., a flash device) and related electronic device and machine-readable medium are proposed.

According to a first aspect of the present invention, an exemplary method of creating a target storage layout table referenced for partitioning a storage space of a storage device is disclosed. The exemplary method includes following steps: identifying defective storage areas in the storage space of the storage device, and accordingly generating an identification result; and creating the target storage layout table according to the identification result.

According to a second aspect of the present invention, an exemplary electronic device is disclosed. The exemplary electronic device includes a processor, a storage device, and a machine-readable medium. The machine-readable medium stores a program code. The processor is configured to execute the program code for identifying defective storage areas in a storage space of the storage device, and accordingly generating an identification result; and creating a target storage layout table referenced for partitioning the storage space of the storage device according to the identification result.

According to a third aspect of the present invention, an exemplary machine-readable medium is disclosed. The exemplary machine-readable medium stores a program code that, when executed by a processor, causes the processor to perform following steps: identifying defective storage areas in a storage space of a storage device, and accordingly generating an identification result; and creating a target storage layout table referenced for partitioning the storage space of the storage device according to the identification result.

According to a fourth aspect of the present invention, an exemplary method of partitioning a storage space of a storage device is disclosed. The exemplary method includes: identifying defective storage areas in the storage space of the storage device, and accordingly generating an identification result; and partitioning the storage space of the storage device according to the identification result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
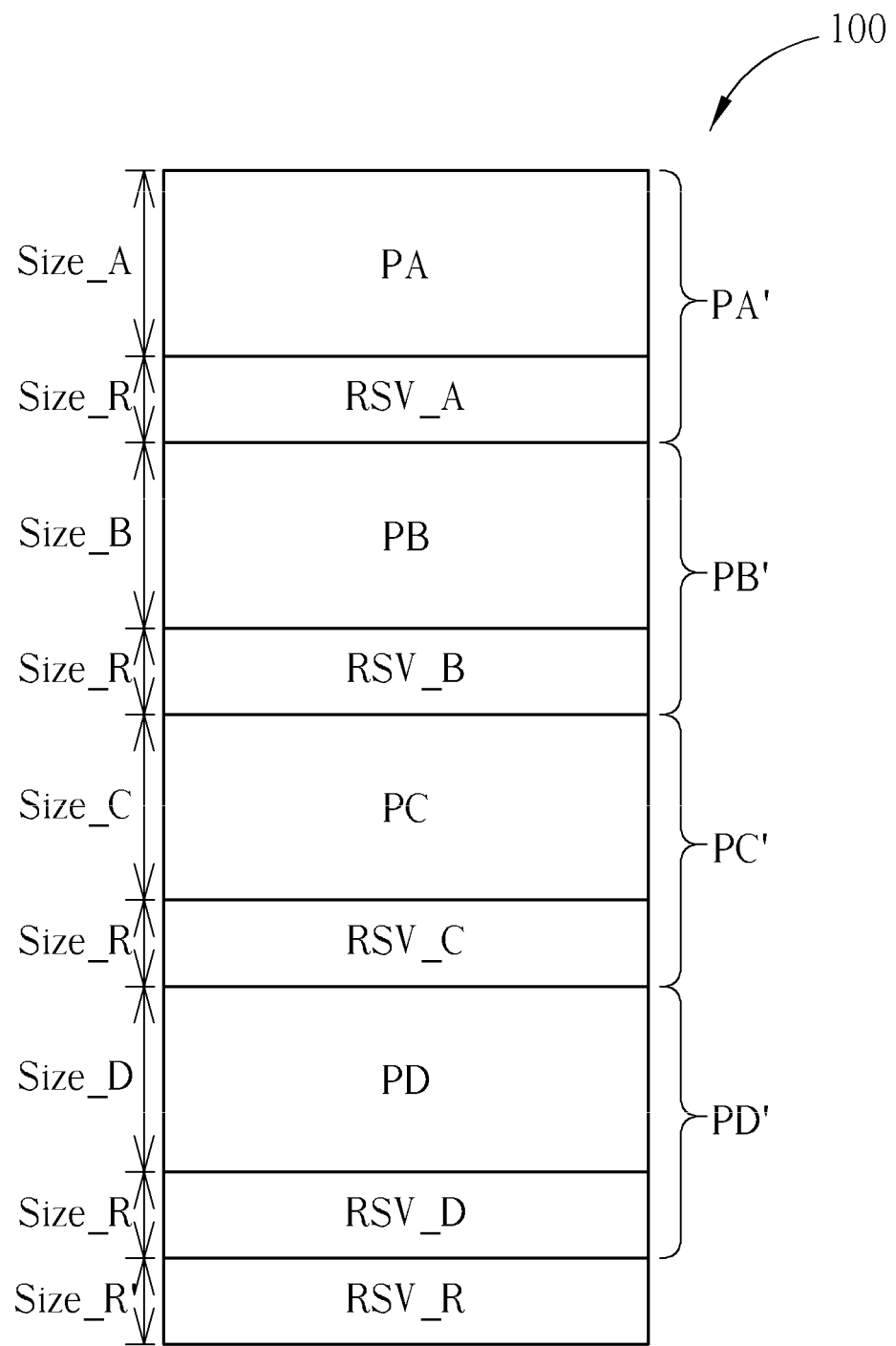
FIG. 1 is a diagram illustrating a conventional flash layout table.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections. Technical features of the present invention are detailed as follows.

The main conception of the present invention is to identify defective storage areas in the storage space of the storage device and accordingly generate an identification result, and then create a target storage layout table according to the identification result. Please refer to FIG. 2, which is a flowchart illustrating a method of creating a target storage layout table referenced for partitioning a storage space of a storage device according to an exemplary embodiment of the present invention. Please note that if the result is substantially the same, the steps are not required to be executed in the exact order shown in FIG. 2. The exemplary method includes the following steps.

Step 200: Start.

Step 202: Check if a pre-defined storage layout table of a storage device is changed. If yes, go to step 206; otherwise, go to step 204.

Step 204: Check if the storage device is initialized for the first time. If yes, go to step 206; otherwise, go to step 216.

Step 206: Identify defective storage areas in a storage space of the storage device and accordingly generate an identification result.

Step 208: Check if an actual storage area of the storage device that corresponds to a pre-defined partition with a pre-defined partition size defined in the pre-defined storage layout table has one or more defective areas by referring to the identification result. If yes, go to step 212; otherwise, go to step 210.

Step 210: Set a partition size of the pre-defined partition defined in the created target storage layout table according to the pre-defined partition size. Go to step 214.

Step 212: Set a partition size of the pre-defined partition defined in the created target storage layout table according to the pre-defined partition size and a total size of the identified defective area(s) included in the actual storage area corresponding to the pre-defined partition with the pre-defined partition size defined in the pre-defined storage layout table.

Step 214: Check if the created target storage layout table includes partitions corresponding to all pre-defined partitions with pre-defined partition sizes defined in the pre-defined storage layout table. If yes, go to step 216; otherwise, go to step 208 to deal with another pre-defined partition with a corresponding pre-defined partition size defined in the pre-defined storage layout table.

Step 216: End.

Figure 2:
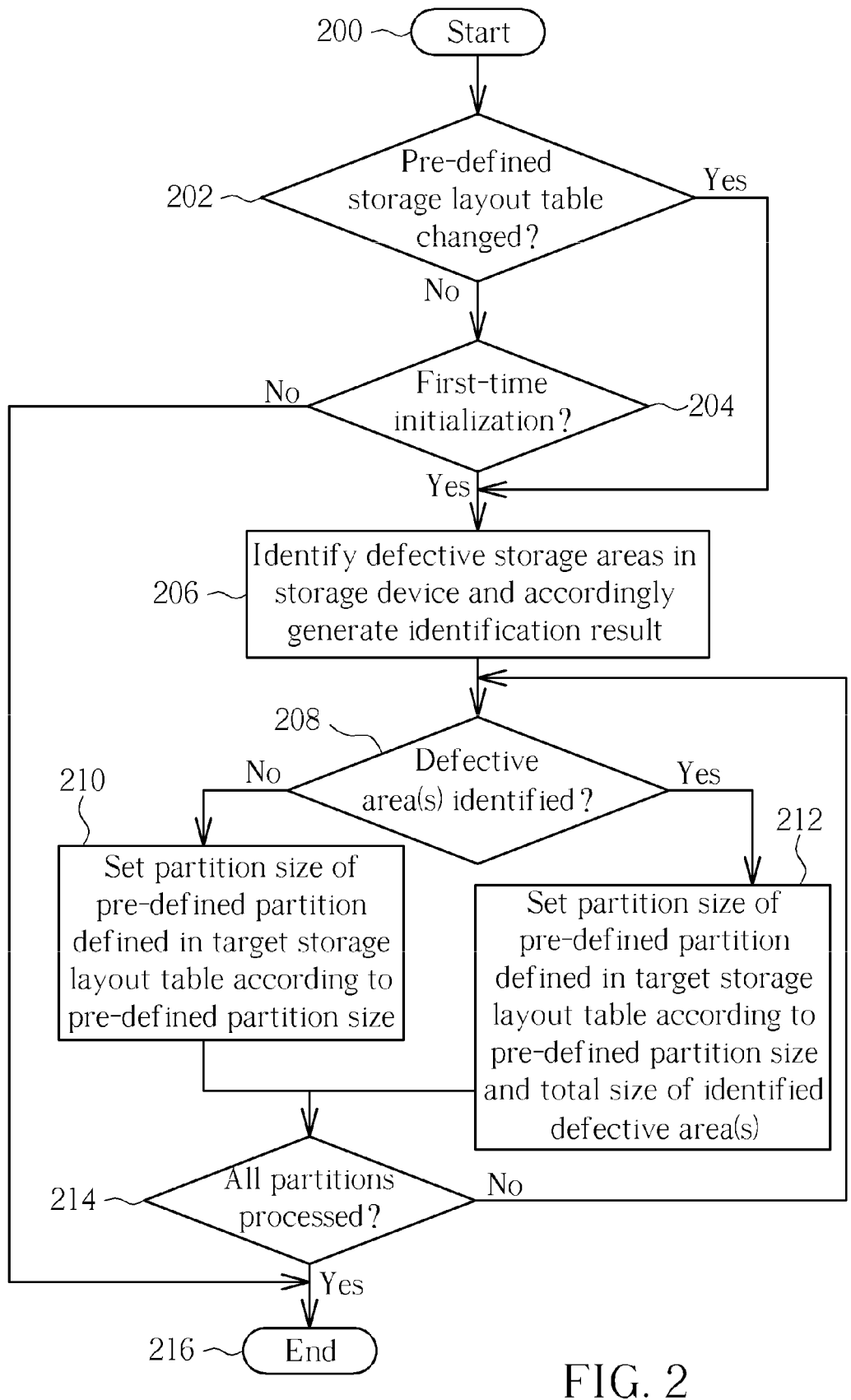
FIG. 2 is a flowchart illustrating a method of creating a target storage layout table referenced for partitioning a storage space of a storage device according to an exemplary embodiment of the present invention.

The exemplary method shown in FIG. 2 may be employed by an electronic device such as a Linux-based embedded system or other computer system. Please refer to FIG. 3, which is a block diagram illustrating an electronic device according to an exemplary embodiment of the present invention. The exemplary electronic device 300 includes, but is not limited to, a processor 302, a storage device 304, and a machine-readable medium 306. The machine-readable medium 306 stores a program code PROG (e.g., a flash driver) that, when executed by the processor 302, causes the processor 302 to perform steps shown in FIG. 2. That is, the processor 302 is configured to perform the steps shown in FIG. 2 for creating the desired target storage layout table. By way of example, but not limitation, the machine-readable medium 306 may be a read-only memory or other data carrier capable of providing the program code PROG to the processor 302. In one exemplary embodiment, the target storage layout table TB2 referenced for partitioning the storage space of the storage device 304 is created in response to a change of the pre-defined storage layout table TB1 or a first-time initialization of the storage device 304. That is, when the pre-defined storage layout table TB1 is modified/changed, for example, due to firmware/program upgrade, the steps directed to creating the target storage layout table TB2 are performed by the processor 302 executing the program code PROG loaded from the machine-readable medium 306 (step 202). In addition, when the storage device 304 is initialized for the first time (e.g., when system's first startup occurs), the steps directed to creating the target storage layout table TB2 are performed by the processor 302 executing the program code PROG loaded from the machine-readable medium 306 (step 204). That is, the steps directed to creating the target storage layout table TB2 are performed in response to a first-time initialization of the storage device 304, and is not performed in response to a subsequent initialization of the storage device 304. It should be noted that the order of executing steps 202 and 204 may be adjusted. For example, in another exemplary embodiment, step 204 may be executed before step 202 is executed.

In a case where the pre-defined storage layout table TB1 is modified or the storage device 304 is initialized for the first time, the processor 302 executes the program code PROG for scanning part or all of the storage space of the storage device 304 to identify defective storage area(s). In one exemplary implementation, only the storage areas belonging to pre-defined partitions with pre-defined partition sizes defined in the pre-defined storage layout table are scanned for defective storage area identification. However, in an alternative implementation, all of the storage areas included in the storage device 304 may be scanned for defective storage area identification.

Figure 4:
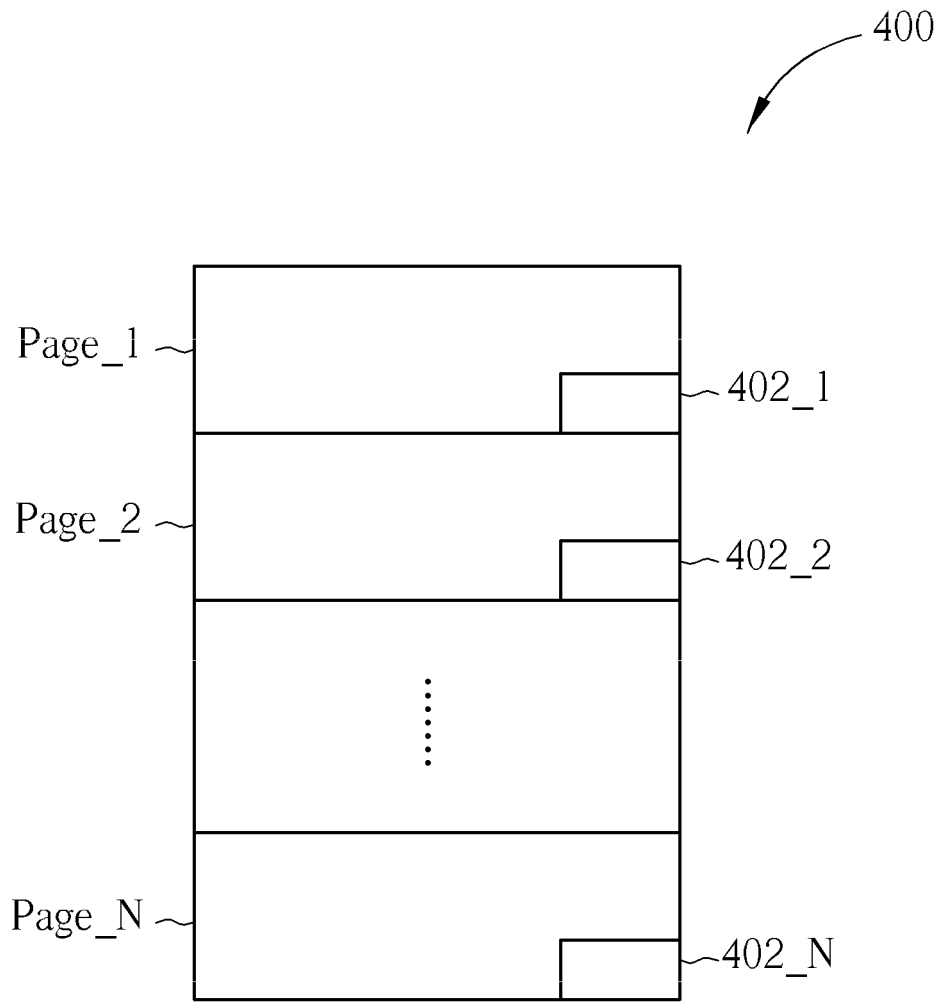
FIG. 4 is a diagram illustrating a block of a flash device.

By way of example, but not limitation, the storage device 304 is a flash device, such as a NAND flash. Thus, the storage device 304 has a plurality of blocks included therein, each block is composed of a plurality of pages, and each defective storage area to be identified is a bad block. FIG. 4 is a diagram illustrating a block of a flash device. As shown in FIG. 4, the block 400 includes many pages Page_1, Page_2, ..., Page_N. Before the flash device manufactured in the factory is shipped to the market, the flash device is programmed/erased to make each bit within the flash device store a predetermined logic value (e.g., 1). Consider a case where the storage device 304 is initialized for the first time, meaning that the content in the storage device is not modified yet. The processor 302 may check the last byte 402_1 of the first page Page_1, the last byte 402_2 of the second page Page_2, and the last byte 402_N of the last page Page_N to determine whether the block 400 is a bad block. For example, when at least one bit of the checked last bytes 402_1, 402_2, and 402_N is not the predetermined logic value (e.g., 1), the processor 302 judges that the block 400 is a bad block; otherwise, the processor 302 regards the block 400 as a good block. However, this is for illustrative purposes, and is not meant to be a limitation of the present invention. That is, any means capable of identifying defective storage areas (e.g., bad blocks) of the storage device 304 (e.g., a flash device) can be adopted to generate the identification result which will be referenced for creating the target storage layout table TB2.

Figure 5:
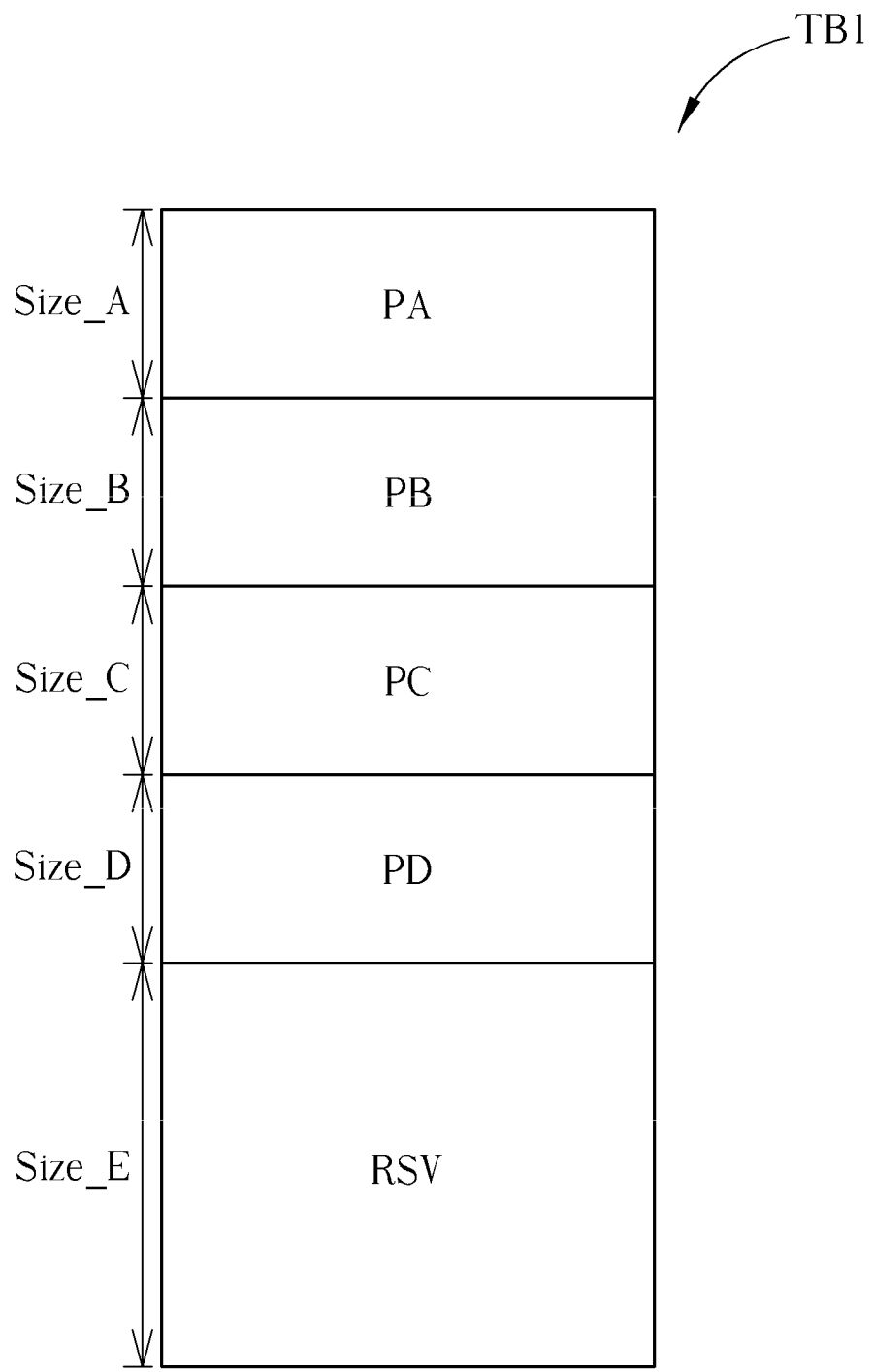
FIG. 5 is a diagram illustrating a pre-defined storage layout table according to an exemplary embodiment of the present invention.

FIG. 5 is a diagram illustrating the pre-defined storage layout table TB1 according to an exemplary embodiment of the present invention. As shown in FIG. 5, the pre-defined storage layout table TB1 includes pre-defined partitions PA, PB, PC, and PD required by the system, wherein the pre-defined partitions PA, PB, PC, and PD have pre-defined partition sizes Size_A, Size_B, Size_C, and Size_D, respectively. In addition, the remaining storage area with the size Size_E may act as a spare/reserved area RSV that can be used for other purposes such as data buffering. If the storage device 304 has no defective storage area included therein, the created target storage layout table TB2 may be identical to the pre-defined storage layout table TB1. However, if the storage device 304 has defective storage areas included therein, the processor 302 selectively adjusts the actual partition sizes of the pre-defined partitions sizes PA, PB, PC, and PD in the target storage layout table TB2 according to the exact locations of the identified defective storage areas. Further details are described as follows.

Figure 3:
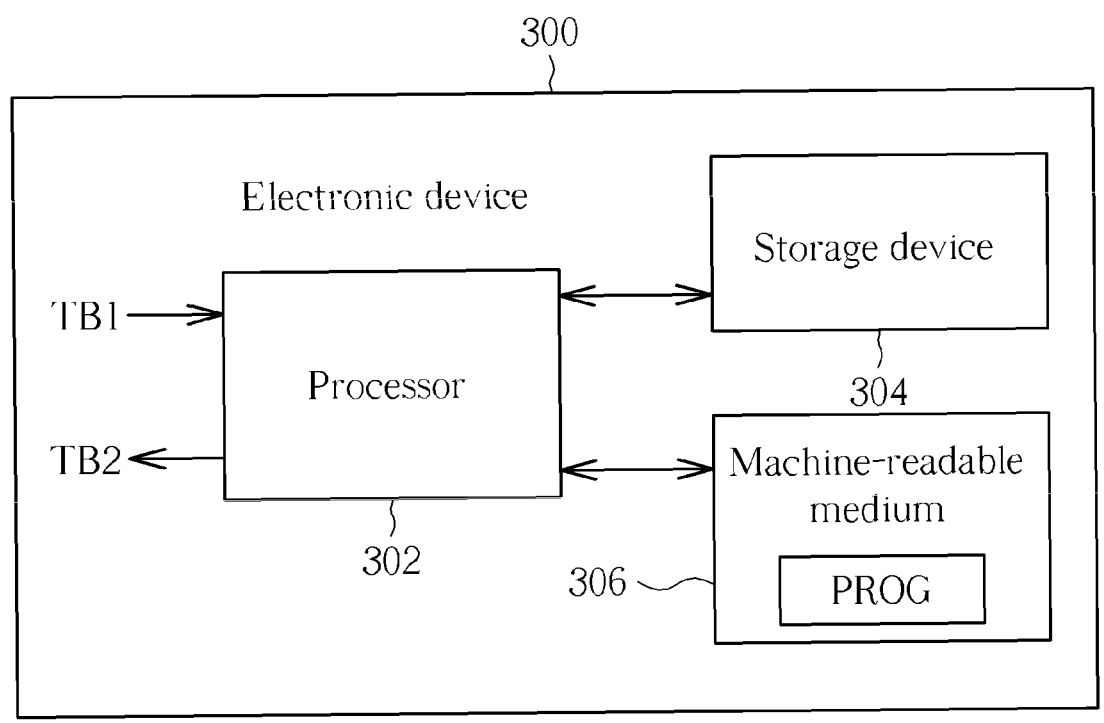
FIG. 3 is a block diagram illustrating an electronic device according to an exemplary embodiment of the present invention.
Figure 6:
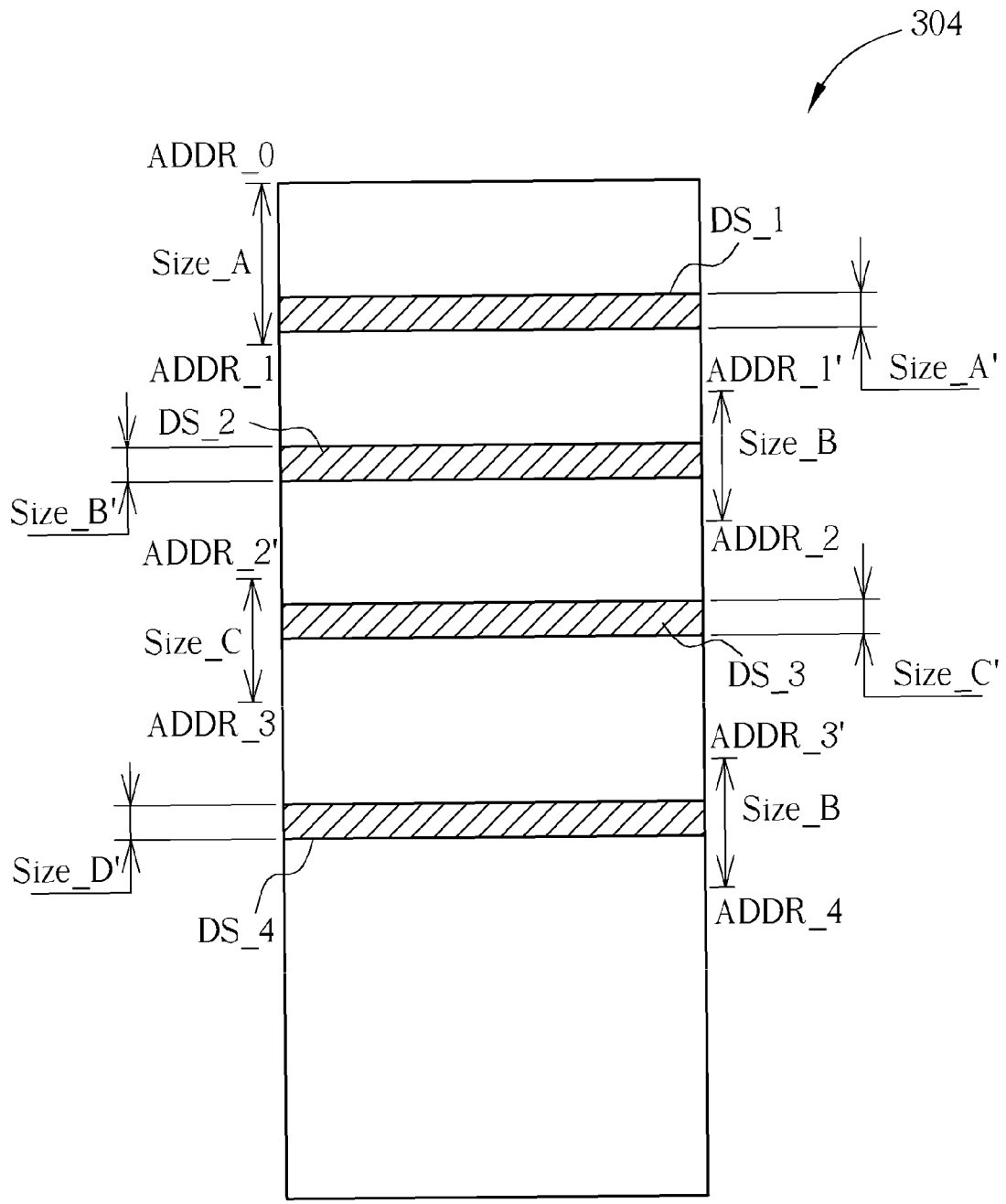
FIG. 6 is a diagram illustrating defective storage areas scattered in a storage device shown in FIG. 3.
Figure 7:
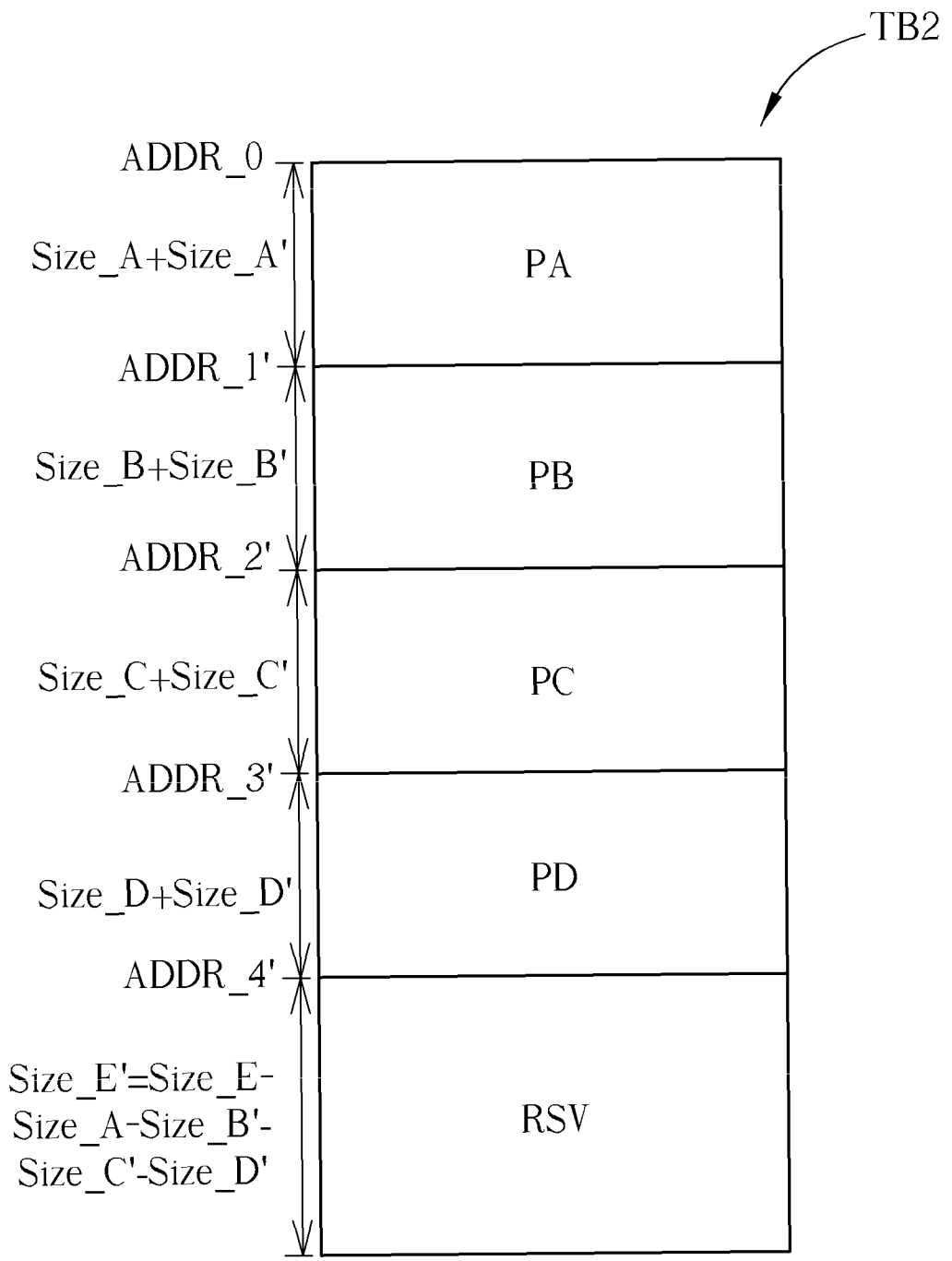
FIG. 7 is a diagram illustrating a target storage layout table according to an exemplary embodiment of the present invention.

Please refer to FIG. 7 in conjunction with FIG. 5 and FIG. 6. FIG. 6 is a diagram illustrating defective storage areas scattered in the storage device 304 shown in FIG. 3, and FIG. 7 is a diagram illustrating the target storage layout table TB2 according to an exemplary embodiment of the present invention. As shown in FIG. 6, the identification result generated in step 206 indicates that the storage device 304 has a plurality of defective storage areas DS_1, DS_2, DS_3, and DS_4 with sizes Size_A', Size_B', Size_C', and Size_D', respectively. For example, each of the defective storage areas DS_1, DS_2, DS_3, and DS_4 may include one or more bad blocks when the storage device 304 is a flash device. Please note that the number of the identified defective storage areas and the sizes of the identified defective storage areas are for illustrative purposes only.

Regarding the first pre-defined partition PA with the pre-defined partition size Size_A in the pre-defined storage layout table TB1, the processor 302 checks if an actual storage area corresponding to the pre-defined partition PA defined in the pre-defined storage layout table TB1 (i.e., an actual storage area delimited by addresses ADDR_0 and ADDR_1 shown in FIG. 6) has one or more defective areas by referring to the identification result (step 208). In a case where there is no defective area in the actual storage area delimited by addresses ADDR_0 and ADDR_1, the processor 302 will set a partition size of the pre-defined partition PA defined in the created target storage layout table TB2 according to the pre-defined partition size Size_A as defined in the pre-defined storage layout table TB1. For example, the pre-defined partition PA defined in the created target storage layout table TB2 is assigned by the same pre-defined partition size Size_A as defined in the pre-defined storage layout table TB1. In another case where the actual storage area delimited by addresses ADDR_0 and ADDR_1 has at least one defective storage area DS_1 as shown in FIG. 6, the processor 302 sets a partition size of the pre-defined partition PA defined in the created target storage layout table TB2 according to the pre-defined partition size Size_A defined in the pre-defined storage layout table TB1 and a total size Size_A' of identified defective area(s) included in the actual storage area delimited by addresses ADDR_0 and ADDR_1. For example, the partition size of the pre-defined partition PA is set by summing up the pre-defined partition size Size_A and the total size Size_A' of identified defective area(s) included in the actual storage area delimited by addresses ADDR_0 and ADDR_1, as shown in FIG. 7. However, this is for illustrative purposes only. That is, the partition size of the pre-defined partition PA may be set by any computational result derived from the pre-defined partition size Size_A and the total size Size_A' of identified defective area(s). This also obeys the spirit of the present invention. As the partition sizes of other pre-defined partitions PB-PD in the created target storage layout table TB2 are not determined yet, the processor 302 proceeds to dealing with another pre-defined partition defined in the pre-defined storage layout table TB1 (step 214).

Regarding the second pre-defined partition PB with the pre-defined partition size Size_B in the pre-defined storage layout table TB1, the processor 302 checks if an actual storage area corresponding to the pre-defined partition PB defined in the pre-defined storage layout table TB1 (i.e., an actual storage area delimited by addresses ADDR_1' and ADDR_2 shown in FIG. 6, where ADDR_1'=ADDR_1+Size_A') has one or more defective areas by referring to the identification result (step 208). In a case where there is no defective area in the actual storage area delimited by addresses ADDR_1' and ADDR_2, the processor 302 will set a partition size of the pre-defined partition PB defined in the created target storage layout table TB2 according to the pre-defined partition size Size_B as defined in the pre-defined storage layout table TB1. For example, the pre-defined partition PB defined in the created target storage layout table TB2 is assigned by the same pre-defined partition size Size_B as defined in the pre-defined storage layout table TB1. In another case where the actual storage area delimited by addresses ADDR_1' and ADDR_2 has at least one defective storage area DS_2 as shown in FIG. 6, the processor 302 sets a partition size of the pre-defined partition PB defined in the created target storage layout table TB2 according to the pre-defined partition size Size_B defined in the pre-defined storage layout table TB1 and a total size Size_B' of identified defective area(s) included in the actual storage area delimited by addresses ADDR_1' and ADDR_2. For example, the partition size of the pre-defined partition PB is set by summing up the pre-defined partition size Size_B and the total size Size_B' of identified defective area(s) included in the actual storage area delimited by addresses ADDR_1' and ADDR_2, as shown in FIG. 7. Similarly, this is for illustrative purposes only. That is, the partition size of the pre-defined partition PB may be set by any computational result derived from the pre-defined partition size Size_B and the total size Size_B' of identified defective area(s).

As a person skilled in the art can readily understand how to set partition sizes of the remaining pre-defined partitions PC and PD in the created target storage layout table TB2 after reading above paragraphs, further description is omitted here for brevity.

Please note that the spare/reserved area RSV defined in the created target storage layout table TB2 has the size Size_E' which is determined by subtracting Size_A', Size_B', Size_C', and Size_D' from Size_E. Compared to the conventional flash layout table 100 shown in FIG. 1, the target storage layout table TB2 created using the proposed exemplary method shown in FIG. 2 has the spare reserved area RSV larger than the spare reserved area RSV_R. In addition, the partition size of the pre-defined partition in the target storage layout table TB2 is properly set by either the pre-defined partition size as defined in the pre-defined storage layout table TB1 or adjusting the pre-defined partition size as defined in the pre-defined storage layout table TB1 according to the defective storage areas actually detected rather than an estimated maximum number of defective storage areas contained in the storage device (e.g., an estimated maximum number of bad blocks scattered around a flash device). In this way, the storage device initialized using the exemplary target storage layout table TB2 shown in FIG. 7 has improved flexibility in the use of the spare reserved area RSV and less waste of the storage space of the storage device. Thus, the overall performance of the electronic device 300 can be improved accordingly.

It should be noted the exemplary method proposed in the present invention is not limited to creating a flash layout table of a flash device. Actually, the exemplary method proposed in the present invention may be applied to any storage device having the need for partitioning its storage space. Besides, no matter whether a target flash layout table is created and referenced, any application that partitions a storage space of a storage device by referring to an identification result of defective storage area(s) still obeys the spirit of the present invention and falls within the scope of the present invention. To put it another way, the present invention may also be regarded as proposing a method of partitioning a storage space of a storage device by identifying defective storage areas in the storage space of the storage device and accordingly generating an identification result, and partitioning the storage space of the storage device according to the identification result. In one exemplary implementation, the step of partitioning the storage space of the storage device according to the identification result includes the steps of creating a target storage layout table according to the identification result, and partitioning the storage space of the storage device according to the target storage layout table.

It should be noted that the flow shown in FIG. 2 would create a target storage layout table by checking all pre-defined partitions in the pre-defined storage layout table to determine whether the corresponding pre-defined partition sizes should be adjusted. However, this is for illustrative purposes only, and is not meant to be a limitation of the present invention. In an alternative design of creating a target storage layout table, some of the pre-defined partitions defined in the pre-defined storage layout table are checked to see if the corresponding pre-defined partition sizes originally defined in the pre-defined storage layout table should be adjusted according to the identification result of defective storage area(s), and the remaining pre-defined partitions are still assigned with corresponding pre-defined partition sizes originally defined in the pre-defined storage layout table. That is, step 214 in FIG. 2 is optional and may be omitted according to actual design consideration.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of creating a target storage layout table, comprising:
   identifying defective storage areas in a storage space of a storage device, and accordingly generating an identification result;
   creating the target storage layout table referenced for partitioning the storage space of the storage device into partitions according to the identification result, wherein a partition size of at least one of the partitions defined by the target storage layout table is set by referring to at least the identification result; and
   when the identification result indicates that an actual storage area corresponding to a pre-defined partition with a pre-defined partition size has at least one defective area, setting the partition size of the at least one of the partitions defined in the target storage layout table by summing up the pre-defined partition size and a size of the at least one defective area.

2. The method of claim 1, wherein the storage device is a flash device, and each of the identified defective storage area is a bad block of the flash device.

3. The method of claim 1, further comprising:
   reading a pre-defined storage layout table, wherein the pre-defined partition and the pre-defined partition size of the pre-defined partition are defined in the pre-defined storage layout table.

4. The method of claim 3, wherein the method is performed in response to a change of the pre-defined storage layout table.

5. The method of claim 1, wherein the step of creating the target storage layout table comprises:
   when the identification result indicates that the actual storage area corresponding to the pre-defined partition with the pre-defined partition size has no defective area, setting the partition size of the pre-defined partition defined in the target storage layout table according to the pre-defined partition size.

6. The method of claim 1, wherein the method is performed in response to a first-time initialization of the storage device, and is not performed in response to a subsequent initialization of the storage device.

7. An electronic device, comprising:
   a processor;
   a storage device; and
   a machine-readable medium, storing a program code, wherein the processor is configured to execute the program code for identifying defective storage areas in a storage space of the storage device, and accordingly generating an identification result;

creating a target storage layout table referenced for partitioning the storage space of the storage device into partitions according to the identification result, wherein a partition size of at least one of the partitions defined by the target storage layout table is set by referring to at least the identification result; and when the identification result indicates that an actual storage area corresponding to a pre-defined partition with a pre-defined partition size has at least one defective area, setting the partition size of the at least one of the partitions defined in the target storage layout table by summing up the pre-defined partition size and a size of the at least one defective area.

8. The electronic device of claim 7, wherein the storage device is a flash device, and each of the identified defective storage area is a bad block of the flash device.

9. The electronic device of claim 7, wherein the processor is further configured to execute the program code for reading a pre-defined storage layout table, wherein the pre-defined partition and the pre-defined partition size of the pre-defined partition are defined in the pre-defined storage layout table.

10. The electronic device of claim 9, wherein the processor executes the program code in response to a change of the pre-defined storage layout table.

11. The electronic device of claim 7, wherein the step of creating the target storage layout table comprises:

when the identification result indicates that the actual storage area corresponding to the pre-defined partition with the pre-defined partition size has no defective area, setting the partition size of the pre-defined partition defined in the target storage layout table according to the pre-defined partition size.

12. The electronic device of claim 7, wherein the processor executes the program code in response to a first-time initialization of the storage device, and does not execute the program code in response to a subsequent initialization of the storage device.

13. A non-transitory machine-readable medium storing a program code that, when executed by a processor, causes the processor to perform following steps:

identifying defective storage areas in a storage space of a storage device, and accordingly generating an identification result;

creating a target storage layout table referenced for partitioning the storage space of the storage device into partitions according to the identification result, wherein a partition size of at least one of the partitions defined by the target storage layout table is set by referring to at least the identification result; and when the identification result indicates that an actual storage area corresponding to a pre-defined partition with a pre-defined partition size has at least one defective area, setting the partition size of the at least one of the partitions defined in the target storage layout table by summing up the pre-defined partition size and a size of the at least one defective area.

14. The non-transitory machine-readable medium of claim 13, wherein the step of creating the target storage layout table comprises:

when the identification result indicates that the actual storage area corresponding to the pre-defined partition with the pre-defined partition size has no defective area, setting the partition size of the pre-defined partition defined in the target storage layout table according to the pre-defined partition size.

15. A method of partitioning a storage space of a storage device, comprising:

identifying defective storage areas in the storage space of the storage device, and accordingly generating an identification result; and partitioning the storage space of the storage device into partitions according to the identification result, wherein a partition size of at least one of the partitions is set by referring to at least the identification result; and when the identification result indicates that an actual storage area corresponding to a pre-defined partition with a pre-defined partition size has at least one defective area, setting the partition size of the at least one of the partitions defined in a target storage layout table by summing up the pre-defined partition size and a size of the at least one defective area.

\* \* \* \* \*